United States Patent Office 2,693,463
Patented Nov. 2, 1954

2,693,463

SEPARATION OF UREA TYPE COMPLEXES FROM REACTION MIXTURES

Harry R. Robinson, Port Arthur, Tex., assignor to The Texas Company, New York, N. Y., a corporation of Delaware No Drawing. Application March 20, 1952, Serial No. 277,719

11 Claims. (Cl. 260—96.5)

This invention relates to a process for effecting complex formation by contact of a complexing agent such as urea with an organic mixture containing complex-forming constituents. The process of the invention is particularly applicable to the preparation of low pour diesel oils and low Freon haze lube oils by dewaxing with urea.

It has recently been discovered that urea and thiourea form solid complexes with certain types of organic compounds. The class of compounds which complex with urea comprises normal aliphatic hydrocarbons containing at least six carbon atoms, terminal-substituted normal aliphatic hydrocarbons containing at least six carbon atoms, such as n-decanol and n-dodecylbenzene and some methyl-substituted n-aliphatic hydrocarbons. Thiourea forms solid complexes with some branched chain hydrocarbons and some naphthenes; triptane, 2,3-dimethylbutane, cyclopentane and cyclohexane are examples of compounds which complex with thiourea. The discovery of the complex-forming ability of urea and thiourea provides a very useful tool in the resolution of organic mixtures such as petroleum fractions. Urea complexing is particularly useful in the isolation of specific compounds and in the removal of undesirable components from petroleum fractions. Dewaxing of petroleum fractions such as gas oils and lubricating oils to produce low wax content products illustrates the use of urea complexing to free a petroleum fraction of undesirable constituents. The main commercial usefulness of urea complexing at the present time lies in the dewaxing of gas oils and lubricating oil fractions; low pour diesel fuel is in demand as a jet fuel and for cold weather operation of diesel engines; refrigerator oils characterized by low pour and Freon haze test are required in air conditioning and refrigeration equipment.

Various procedures have been proposed for effecting complex formation between complexing agents such as urea and complex-forming constituents of organic mixtures. It has been proposed that complex formation be effected by contacting an organic mixture with a saturated or supersaturated solution of urea in a polar solvent such as aliphatic alcohols, aliphatic ketones, water, etc. Complex formation is also effected by contacting an organic mixture with a slurry of complexing agent in a polar solvent. In addition, complex formation is effected by contacting an organic mixture with a fixed bed of urea wherein the urea is employed in conjunction with a particulate solid which is advantageously an adsorbent. In these various techniques for effecting complex formation, the presence of a polar compound such as water, an aliphatic alcohol or an aliphatic ketone expedites complex formation.

The process of this invention is concerned with complex formation employing solutions or slurries of complexing agent in solvent media such as water and oxygenated hydrocarbons. The invention is particularly useful when oxygenated hydrocarbons, for example, alcohols, are employed as the solvent media. In accordance with the process of this invention, contact of an organic mixture containing complex-forming constituents with a solution or slurry of complexing agent is effected with agitation at a temperature below about 140° F. in the presence of a small quantity of an organo-silicon oxide condensation product. Contact between organic mixture and complexing agent in the presence of solvent causes formation of a solid complex comprising complexing agent and complex-forming constituents. After agitated contact is completed, the separation of the solid complex from the organic mixture is remarkably improved by the presence of an organo-silicon oxide condensation product which causes rapid agglomeration and precipitation of the solid complex. Employing a slurry of complexing agent, the presence of an organo-silicon oxide condensation product effects rapid precipitation of a solid phase comprising complex and excess complexing agent. The presence of an organo-silicon oxide condensation product causes complex fines and complexing agent fines to rapidly coalesce and precipitate so that separation of the treated organic liquid from solid phase is greatly simplified. The effect of an organo-silicon oxide condensation product on coagulation rate, settling characteristics and filtration rate is particularly noticeable on slurry-type complexing because of the presence therein of excess solid complexing agent.

An unusual feature of this invention is that the very organo-silicon oxide condensation products which markedly improve the complexing reaction, are usually incorporated in the finished oil as anti-foam agents. For example, silicones, a class of organo-silicon oxide condensation products, are generally added to finished refrigerator oils as foam inhibitors. The use of silicones as additives for fuel fractions such as gas oil has also been disclosed. This invention, consisting of the discovery that organo-silicon oxide condensation products greatly improve the manufacture of low pour lube oils and gas oils by urea complexing, has the highly desirable characteristic of effecting a significant improvement in a manufacturing operation by incorporating therein an ingredient of the finished oil.

The solvents employed in the preparation of complexing agent solutions or slurries are usually alcohols such as methyl, ethyl, propyl or butyl alcohols or mixtures thereof. Low molecular weight alcohols having a substantial solubility for urea and thiourea are usually employed, but other oxygenated hydrocarbons such as low molecular weight ketones, for example, acetone and methyl ethyl ketone, are also employed as solvents. Water may be employed as the solvent medium, but its use is not recommended with high molecular weight hydrocarbon fractions because of the immiscibility of water and high molecular weight hydrocarbons. Solvent media such as alcohols and ketones act as catalysts for complex formation by providing a neutral solvent wherein molecular contact of complexing agent and complex-forming constituents occurs.

The presence of solvent media complicates the separation of the treated oil from complex and excess complexing agent, if any, because of its apparent peptizing action on fines of the complex and of excess complexing agent; the latter is present if a slurry of complexing agent is used. After cessation of agitated contact, the major portion of complex rapidly settles, but a significant quantity of complex remains suspended throughout the treated mixture in the form of fines. The discovery of the outstanding effect of an organo-silicon oxide condensation product on the settling characteristics of complex and complexing agent has made the manufacture of refrigerator oils and low pour diesel oils by urea complexing a commercial reality.

The process of the invention provides a simple procedure for the preparation of low pour diesel fuels and refrigerator oils which meet test specifications. When contact of a hydrocarbon fraction with a solution or slurry of urea is effected in the presence of an organo-silicon oxide condensation product, the product oil obtained by filtration or decantation followed by a finishing operation comprising washing and drying is characterized by extremely low wax contents; a refrigerator oil having a Freon haze test less than —70° F. is simply produced by dewaxing a lubricating oil fraction with an alcoholic slurry of urea in the presence of an organo-silicon oxide condensation product, and, in similar fashion, a diesel fraction having a —100° F. pour can be prepared by dewaxing of a gas oil fraction.

Separation of the complex from the treated organic mixture and solvent medium is effected by filtration or decantation. The presence of an organo-silicon oxide condensation product during complex formation permits more rapid separation of complex by filtration, since a more porous filter cake is formed. The effect of organo-silicon oxide condensation products on the rapid coalescence and settling of the complex modifies the crystal size of the complex so that a highly porous filter cake is formed.

Organo-silicon oxide condensation products may be formed by polymerization or condensation of organic silicols, containing one to three hydroxy groups and mixtures thereof. Silicols contain at least one organic radical and one to three hydroxyl groups attached to a silicon atom.

Silicones which are one of the preferred types of organo-silicon oxide condensation products employed in the process of the invention are represented by the following formula:

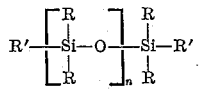

in which $n$ is at least 1 and R and R' represent similar or dissimilar organic radicals; R and R' may be aliphatic radicals including alkyl and alkenyl groups, an aryl group, an aralkyl group, an alkaryl group, a naphthenyl group or a heterocyclic group; the terminal R's may be a hydroxyl group in addition to the previously listed radicals represented by R; all but one of the R or R's attached to the silicon atoms may be substituted by hydroxyl groups or halogen atoms.

Silicones of this type may be formed in straight chains, cyclic or cross chain polymerization products, and may be liquids or solids, although liquid products are preferred in the process of this invention.

Usually R and R' are a single organic aliphatic radical of low molecular weight containing one to eight carbon atoms; methyl, ethyl propyl, amyl, hexyl, butenyl groups are examples of radicals usually employed. However, organo-silicon oxide condensation products can be employed wherein the organic radical is an aromatic group, such as phenyl and tolyl, or a naphthenyl group such as cyclohexyl. The organic radicals may also comprise a mixture of aliphatic radicals, a mixture of aliphatic and aryl radicals and a mixture of aliphatic, aryl and naphthenyl radicals. In general, the organic radicals may be aryl, aliphatic, naphthenyl or heterocyclic radicals or any mixture thereof.

A preferred compound is dimethyl silicone having the following formula:

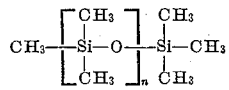

in which $n$ is at least 1. In most instances, it is believed that dimethyl silicone contains a number of polymers of the above composition of varying chain lengths and perhaps different chain types. Examples of other silicones which can be employed in the process of the invention are diethyl silicone, methyl phenyl silicone and diphenyl silicone.

Silicones of the type represented by the general formula given above are available in a wide range of viscosities, depending on the number of silicone radicals present therein. Silicones containing a viscosity in the range of 50 to 250 c. s. (centistokes) and preferably in the range of approximately 100 to 200 c. s. are usually employed.

Silicates are another class of organo-silicon oxide condensation products which may be employed in the process of the invention, and they are represented by the following formula:

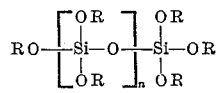

wherein $n$ is at least 1 and R represents similar or dissimilar organic radicals; R may be an aliphatic group, an aralkyl group, an aryl group, an alkaryl group, a naphthenyl group or a heterocyclic group or mixtures thereof. Silicates are prepared by the controlled or partial hydrolysis of tetraortho-silicate esters with water. In the silicates, similarly to the silicones, the preferred materials are those containing organic radicals of low molecular weight such as methyl, ethyl, propyl, etc., but it is contemplated that higher molecular weight organic radicals such as hexyl, phenyl, tolyl, etc. can be used alone or in combination with low molecular weight radicals. In general, the R radical in silicates is similar to the R radical in silicones whose scope has been described in detail.

Organo-silicon oxide condensation products which are partially silicones and partially silicates and which contain both OR and R radicals attached to the silicon atom may also be employed in the process of the invention.

A preferred organo-silicon oxide condensation product for the process of this invention is a dimethyl silicone polymer which is end-blocked with methyl groups and which has a viscosity of about 100 at 170° F. and a specific gravity of 0.96 to 0.99 at this temperature. Another preferred organo-silicon oxide condensation product is methyl phenyl silicone having a viscosity of about 500 c. s. and a specific gravity of 1.00 at 480° F.

Since the foregoing organo-silicon oxide condensation products comprising silicones, silicates and silicon compounds containing both OR and R radicals attached to the silicon atoms are well known in the art and since no claim is made thereto, further discussion thereof is considered unnecessary.

The rapid coagulation and settling of complex and excess complexing agent is effected by the presence of very small amounts of organo-silicon oxide condensation products. The addition of organo-silicon oxide condensation products in an amount between 1 and 25 parts per million of complexing mixture has a significant effect on the rate at which the complex settles and the clear supernatant oil fraction is attained. In general, it is recommended that no more than about 25 parts per million of organo-silicon oxide condensation product be added to the complex and reaction mixture, since it is undesirable for the finished oil to have a higher concentration of organo-silicon oxide condensation product.

Since the organo-silicon oxide condensation products are employed in such quantities, it is customary to employ them in concentrates consisting of approximately 10 per cent organo-silicon oxide condensation product in a hydrocarbon solution. A concentrate which has been used in the process of this invention is Dow-Corning A. F. C. which consists of 10 grams of dimethyl silicone made up to 100 ml. by addition of kerosene. It has been found that the addition of 50 parts per million of this A. F. C. concentrate was very effective in expediting the rate at which the complex settled and a clear supernatant oil fraction was obtained during urea complexing.

If complex formation is effected with a solution of complexing agent, it is necessary to employ saturated or near saturated solutions in order to effect substantially complete complex formation with the complex-forming constituents of the organic mixture. Since urea solvents can be used to decompose the complex, substantial complex decomposition occurs if dilute solutions are employed because of the extra dissolving power of the dilute urea solution. A preferred method of employing solution of urea as a complexing agent involves adding to the solution a slight excess of solid urea which acts as a reserve and assures the presence of a saturated solution during complex formation.

Slurries of complexing agent are simply prepared by suspending complexing agent in a small quantity of polar solvent. Ordinarily, the polar solvent constitutes 1 to 10 per cent of the mixture to be treated. The advantages of slurry operation are that much smaller equipment is required and there is more assurance of complete removal of complex forming constituents because of the large excess of complexing agent.

In slurry operation, sufficient slurry is employed to maintain a urea dosage of 5 to 50 pounds of urea per barrel of hydrocarbon oil treated and a solvent dosage of approximately 1 to 5 per cent solvent per volume of oil charged. The use of larger amounts of solvent is not detrimental to the complex formation, but is impractical. Excellent results have been obtained with a slurry charge containing approximately 1.5 to 2.5 volume per cent solvent per barrel of oil charged.

The urea dosage will depend to a great extent upon the complex-forming constituents present in the oil to be treated. In the manufacture of refrigerator oils, the charged lubricating oils contain a low wax content so that the urea dosage is in the lower portion of the prescribed range, which is in the range of approximately 2 to 17 pounds of urea per barrel of oil. However, with fractions such as gas oil which contain a larger percentage of complex-forming constituents, it is necessary to employ higher urea dosages in the range of 20 to 50 pounds of urea per barrel of oil treated.

In general, smaller dosages of complexing agent are required when complex formation is effected by the solution technique. Although only about one half the amount of complexing agent is required when applying the solution technique, the equipment requirements are exceptionally large, since a large volume of solvent is required to prepare sufficient saturated solution to give the necessary urea dosage.

It is necessary to agitate the mixture of charge oil and urea slurry or solution in order to obtain rapid and complete complex formation in practical periods of time.

It has been found that complex formation by contact of an organic mixture with an alcoholic slurry of urea requires approximately 1 to 10 hours in order to effect substantially complete complex formation. For example, in dewaxing a lubricating oil fraction having a SUS viscosity of 300 at 100° F., approximately 6 hours of agitated contact were required to effect substantially complete complex formation. When solutions of urea are employed as the contacting agent, complex formation is effected in shorter times than are required for slurry operation. Contact times of approximately 20 to 40 minutes are sufficient for complex formation with urea solutions.

Contact between the organic mixture and alcoholic urea slurry under agitation conditions must be effected at temperatures below about 140° F. Advantageously, however, temperatures between 70 and 120° F. are employed during complex formation. When the object of the invention is to remove low molecular weight complex-forming constituents such as hexane, heptane and octane, from a gasoline fraction, temperatures between 0 and 50° F. must be employed. In general, however, room temperature has been found to be effective for removal of $C_{10}$ and higher complex-forming constituents from organic mixtures.

Apparently, complex formation does not possess critical pressure limitations. Accordingly, atmospheric pressure is ordinarily employed for the agitated contact of organic mixture and urea although there is no objection to the use of sub-atmospheric or super-atmospheric pressure if the use of these pressures is dictated by other considerations.

In slurry type operation, the solid fraction separated either by filtration or by decantation comprises a minor portion of complex and a major portion of excess complexing agent, and still possesses complexing power. This solid fraction is ordinarily recycled to the complex zone with the result that the amount of fresh urea required for complexing is substantially reduced. Ordinarily, the total solid fraction minus an amount equivalent to the amount of fresh urea is recycled to the complexing zone. For example, if the complexing agent is used in an amount equivalent to 7½ pounds of complexing agent per barrel of oil, the total complexing agent ordinarily comprises 5½ pounds of recycled solid fraction and 2 pounds of fresh urea suspended in alcohol slurry; the total solid fraction with the exception of 2 pounds per barrel of oil is recycled to the complexing zone.

Although the recovery of normal aliphatic constituents from the complex is not of concern in the subject invention, the decomposition of the complex and recovery of normal aliphatic components therefrom are simply effected. Decomposition of the complex into constituents is effected by contacting with a urea solvent or with a hydrocarbon solvent at prescribed temperature conditions. The complex is decomposed on contact with an aromatic solvent such as benzene, a naphthenic solvent such as cyclohexane, or a low molecular weight aliphatic hydrocarbon such as pentane which does not complex at atmospheric conditions, and the complex-forming constituents are extracted therefrom in the solvent; the complex-forming constituents are recovered from the extract solution by distillation. The alternate procedure for decomposing the complex involves treating the separated solid phase with a hydrocarbon-immiscible urea solvent such as water or methanol whereby the complex is decomposed with the dissolution of urea in the solvent. The complex-forming constituents are insoluble in the urea solution, and are readily separated therefrom.

The following example illustrates the improved results which are attained by effecting complex formation with urea in the presence of an organo-silicon oxide condensation product. In this example, the invention is illustrated by the addition of dimethyl silicone to a urea slurry process for manufacturing a refrigerator oil.

A urea slurry prepared by mixing 7 pounds of urea in about .72 gallons of a 2:1 methanol-isopropanol mixture is added to a naphthene base lube oil having a pour of −45° F. and a Freon haze test of −45° F. and a Saybolt Universal viscosity at 100° F. of about 80. The urea slurry is added to the lube oil in such amounts that 7 pounds of urea are present for every barrel of lube oil. A quantity of Dow-Corning A. F. C. is added so that it is present in 50 parts per million of oil. After the reaction mixture is agitated for a four hour period, the mixture is allowed to settle. The reaction mixture rapidly settles in a settling tank so that a supernatant oil is rapidly attained. The supernatant oil is decanted, filtered and stripped at a temperature of about 310° F. to remove alcohols. The filtration of the oil is rapidly effected because of the effect of the added silicone on the crystal structure of the filtered complex. The product oil has a Freon haze test of −80° F. and a pour below −45° F.

Obviously, many modifications and variations of the invention, as hereinbefore set forth, may be made without departing from the spirit and scope thereof, and, therefore, only such limitations should be imposed as are indicated in the appended claims.

I claim:

1. In a process for effecting complex formation by contact of an organic mixture containing complex-forming constituents with a complexing agent selected from the group consisting of urea and thiourea in the presence of a medium, which is a solvent for said complexing agent, at a temperature below 140° F., the improvement which comprises contacting said organic mixture with said complexing agent and said solvent medium in the presence of an organo-silicon oxide liquid condensation product in sufficient proportion to expedite separation of the formed complex from the organic mixture by contact of said complex with said condensation product.

2. A method according to claim 1 in which said organic mixture is a hydrocarbon fraction.

3. A method according to claim 1 in which a slurry of complexing agent in solvent medium is used.

4. A method according to claim 1 in which a solution of complexing agent is employed.

5. A method according to claim 1 in which 1 to 50 parts of organo-silicon oxide condensation product per million parts of organic mixture are present during contact of organic mixture with complexing agent.

6. A method according to claim 1 in which said organo-silicon oxide condensation product is a silicone compound.

7. A method according to claim 1 in which said organo-silicon oxide condensation product is dimethyl silicone.

8. In a process for effecting complex formation by contact of a hydrocarbon fraction containing complex-forming constituents with a urea slurry suspended in a medium, which is a solvent for urea, at a temperature below 140° F., the improvement which comprises contacting said hydrocarbon fraction with said slurry of urea in said solvent medium in the presence of 1 to 50 parts per million of an organo-silicon oxide liquid condensation product whereby separation of resulting complex and excess complexing agent from said organic mixture is expedited by contact of said complex with said condensation product.

9. A method according to claim 8 in which said organo-silicon oxide condensation product is a silicone compound.

10. A method according to claim 8 in which said organo-silicon oxide condensation product is dimethyl silicone.

11. A method according to claim 8 in which a low molecular weight alcohol is employed as a solvent medium for the urea slurry.

(References on following page)

References Cited in the file of this patent

UNITED STATES PATENTS

| Number | Name | Date |
|---|---|---|
| 2,384,384 | McGregor et al. | Sept. 4, 1945 |
| 2,416,504 | Trautman et al. | Feb. 25, 1947 |
| 2,452,319 | Patterson | Oct. 26, 1948 |
| 2,606,140 | Arnold et al. | Aug. 5, 1952 |

FOREIGN PATENTS

| Number | Country | Date |
|---|---|---|
| 985,633 | France | Mar. 14, 1951 |